US010864829B2

(12) United States Patent
Min et al.

(10) Patent No.: US 10,864,829 B2
(45) Date of Patent: Dec. 15, 2020

(54) ROTARY VEHICLE SEAT FACILITATING BOARDING AND DEBOARDING

(71) Applicant: Kang-Sik Min, Goyang-si, Gyeonggi-do (KR)

(72) Inventors: Kang-Sik Min, Goyang-si (KR); Byung-Kim Min, Goyang-si (KR)

(73) Assignee: Kang-sik Min, gyeonggi-do (KR)

( * ) Notice: Subject to any disclaimer, the term of this patent is extended or adjusted under 35 U.S.C. 154(b) by 0 days.

(21) Appl. No.: 16/327,516

(22) PCT Filed: Aug. 18, 2017

(86) PCT No.: PCT/KR2017/009037
§ 371 (c)(1),
(2) Date: Feb. 22, 2019

(87) PCT Pub. No.: WO2018/038468
PCT Pub. Date: Mar. 1, 2018

(65) Prior Publication Data
US 2019/0176658 A1 Jun. 13, 2019

(30) Foreign Application Priority Data
Aug. 22, 2016 (KR) .................. 10-2016-0106309

(51) Int. Cl.
*B60N 2/14* (2006.01)
*B60N 2/02* (2006.01)
(Continued)

(52) U.S. Cl.
CPC ............... *B60N 2/02* (2013.01); *B60N 2/14* (2013.01); *B60N 2/646* (2013.01); *B60N 2/938* (2018.02); *B60N 2205/30* (2013.01)

(58) Field of Classification Search
CPC .. B60N 2002/022; B60N 2/3095; B60N 2/14; A61G 3/02
(Continued)

(56) References Cited

U.S. PATENT DOCUMENTS 2,822,858 A * 2/1958 Mussler .................. B60N 2/14
296/68
3,253,856 A * 5/1966 Ueda ....................... B60N 2/14
296/68
(Continued)

FOREIGN PATENT DOCUMENTS

DE 102004013628 A1 * 10/2005 ............... B60N 2/43
DE 102005051736 A1 * 5/2007 ............. B60N 2/062
(Continued)

OTHER PUBLICATIONS

International Search Report dated Nov. 23, 2017, issued in PCT Application No. PCT/KR2017/009037, filed Aug. 18, 2017.
(Continued)

*Primary Examiner* — Timothy J Brindley
(74) *Attorney, Agent, or Firm* — Workman Nydegger

(57) ABSTRACT

A rotary car seat facilitating getting in/out of a car includes: a frame portion constituting a framework of a seat and supporting a load; and a sheath portion formed outside the frame portion. The frame portion includes a backrest frame constituting a framework of a backrest seat and supporting a load, and a cushion frame constituting a framework of a cushion seat and supporting a load. The cushion frame includes an upper frame plate on which the sheath portion is seated, a lower frame plate formed beneath the upper frame plate, a link portion connecting the upper frame plate to be able to rotate on the lower frame plate, and a position setting mechanism is configured to set an area of rotation of the upper frame plate. The lower frame plate is connected to the backrest frame, and the upper frame plate is not connected
(Continued)

to the backrest frame such that the upper frame plate can solely rotate independently. The upper frame plate includes a roller portion having a wheel. The lower frame plate includes a guide groove formed to be recessed inward from the lower frame plate along a trajectory of movement of the roller portion that is supposed to move when the upper frame plate rotates around the rotating shaft, so as to guide movement of the roller portion.

13 Claims, 8 Drawing Sheets

(51) Int. Cl.
  *B60N 2/64* (2006.01)
  *B60N 2/90* (2018.01)
(58) Field of Classification Search
  USPC .................................. 297/344.21, 344.22
  See application file for complete search history.

(56) References Cited

U.S. PATENT DOCUMENTS

| | | | | |
|---|---|---|---|---|
| 5,474,353 A | * | 12/1995 | Koester | B60N 2/062 296/65.07 |
| 5,651,576 A | * | 7/1997 | Wallace | A47K 3/001 248/425 |
| 6,113,175 A | * | 9/2000 | Guim | B60N 2/245 296/65.04 |
| 7,866,723 B2 | * | 1/2011 | Ninio | B60N 2/062 296/65.11 |
| 2010/0052392 A1 | * | 3/2010 | Lung | B60N 2/06 297/344.24 |
| 2013/0175839 A1 | * | 7/2013 | Park | A47C 7/402 297/313 |
| 2014/0062155 A1 | * | 3/2014 | Honma | B60N 2/14 297/338 |

FOREIGN PATENT DOCUMENTS

| | | |
|---|---|---|
| JP | H07-051941 Y2 | 11/1995 |
| JP | 2004-098904 A | 4/2004 |
| JP | 2004-291723 A | 10/2004 |
| JP | 2012-236183 A | 12/2012 |
| JP | 2014-051134 A | 3/2014 |

OTHER PUBLICATIONS

Written Opinion dated Nov. 23, 2017, issued in PCT Application No. PCT/KR2017/009037, filed Aug. 18, 2017.

* cited by examiner

ROTARY VEHICLE SEAT FACILITATING BOARDING AND DEBOARDING

BACKGROUND OF THE INVENTION

1. Field of the Invention

The present disclosure relates to a rotary car seat facilitating getting in/out of a car and, more particularly, to a rotary car seat facilitating getting in/out of a car, the rotary car seat including: a frame portion constituting a framework of a seat and supporting a load; and a sheath portion formed outside the frame portion, wherein the frame portion includes a backrest frame constituting a framework of a backrest seat and supporting a load, and a cushion frame constituting a framework of a cushion seat and supporting a load; the cushion frame includes an upper frame plate on which the sheath portion is seated, a lower frame plate formed beneath the upper frame plate, a link portion connecting the upper frame plate to be able to rotate on the lower frame plate, and a position setting means configured to set an area of rotation of the upper frame plate; the lower frame plate is connected to the backrest frame, and the upper frame plate is not connected to the backrest frame such that the upper frame plate can solely rotate independently; the upper frame plate includes a roller portion having a wheel; and the lower frame plate includes a guide groove formed to be recessed inward from the lower frame plate along a trajectory of movement of the roller portion that is supposed to move when the upper frame plate rotates around the rotating shaft, so as to guide movement of the roller portion.

2. Description of the Prior Art

In the case of car seats included in currently available cars, the safety and comfort of occupants in situations during traveling are solely considered, and situations other than traveling are given no special consideration.

FIG. 1 illustrates the interior of a conventional car. It is clear from the illustration that conventional car seats reflect a car traveling situation in which the car travels mostly forward except for special cases such as parking, and seats S are accordingly arranged inside the car such that the body of an occupant sitting on a seat S faces forward.

However, occupants need to get in the car before the car travels, and occupants need to get out of the car when the traveling is over. Therefore, design and arrangement of car seats S are not to be made solely on the basis of the situation during traveling, but need to be made also in view of the situation of occupants getting in and out of the car.

FIG. 2 illustrates a situation in which an occupant gets out of a conventional car. Referring to FIG. 2, the seat S installed in the conventional car faces the front of the car such that, when the occupant opens the door D on the car side and gets in or out, the inconvenient posture illustrated in FIG. 2 is unavoidable.

This makes it difficult for disabled people to get in/out of cars without assistance. In the case of a person holding a child or carrying baggage, it is extremely inconvenient to get in a car while turning the body into a narrow space, or to get out of the car while turning the body from the narrow space to the outside. There are many other problems including embarrassment that may be caused when women wearing short skirts get in/out of cars.

FIG. 3 illustrates a conventional car seat back frame assembly, which is disclosed in Registered Korean Patent Publication No. 10-1047563 (Jul. 1, 2011). Referring to FIG. 3, according to the disclosed prior art 90, the conventional car seat frame is divided into a backrest frame 91 for supporting the load applied when an occupant sits on the car seat and leans his/her back against the same, and a cushion frame 93 connected to the backrest frame 91 so as to support the vertical load of the occupant sitting thereon.

The backrest frame 91 and the cushion frame 93 is connected by a hinge 95 such that the angle between the cushion frame 93 and the backrest frame 91 can be adjusted. Rails 97 are formed beneath the cushion frame 93 and enable the cushion frame 93 to move forward/backward along the rails 97.

However, the prior art 90 has no feature that enables the cushion frame 93 to rotate around a predetermined rotating shaft, thereby the occupant has above-mentioned problem when getting in/out of the car.

Assuming that an additional rotating means is provided beneath such a car seat and is designed such that the entire car seat can rotate, the car seat may collide with peripheral appliances, such as an armrest, inside the narrow inner space of the car, and may become immobilized.

Considering a situation in which the backrest frame 91 is inclined backward from the cushion frame 93 by a large angle, rotation of the entire car seat is more likely to incur interference with the peripheral appliances.

In the case of driving seats, for example, some drivers tend to position the seat close to the steering wheel according to their physique, driving habits, and the like. If the car seat is rotated in such a case, the driver's knees may collide with and be hurt by the steering wheel.

Accordingly, it is necessary to introduce a technology regarding a car seat wherein interference with inner appliances of the car during rotation can be prevented, any concern over safety hazards to the occupant is avoided in advance, and the seat arranged to face forward can naturally rotate in a direction in which the occupant gets in/out of the car, before the car starts traveling, or after the traveling is over.

SUMMARY OF THE INVENTION

The present disclosure has been made in order to solve the above-mentioned problems, and an aspect of the present disclosure is to provide a rotary car seat facilitating getting in/out of a car, the rotary car seat including: a frame portion constituting a framework of a seat and supporting a load; and a sheath portion formed outside the frame portion, wherein the frame portion includes a backrest frame constituting a framework of a backrest seat and supporting a load, and a cushion frame constituting a framework of a cushion seat and supporting a load, and the cushion seat can rotate independently of the backrest seat. The seat arranged to face forward can naturally rotate in a direction in which the occupant gets in/out of the car, before the car starts traveling, or after the traveling is over, thereby facilitating the occupant's getting in/out of the car.

Another aspect of the present disclosure is to provide a rotary car seat wherein the cushion frame includes an upper frame plate on which the sheath portion is seated, a lower frame plate formed beneath the upper frame plate, and a link portion connecting the upper frame plate to be able to rotate on the lower frame plate. The seat arranged to face forward can naturally rotate in a direction in which the occupant gets in/out of the car, before the car starts traveling, or after the traveling is over, thereby facilitating the occupant's getting in/out of the car. The cushion frame is configured in a plate shape such that the load can be distributed, thereby securing durability against repeated rotating movements.

Another aspect of the present disclosure is to provide a rotary car seat facilitating getting in/out of a car wherein the lower frame plate is connected to the backrest frame, and the upper frame plate is not connected to the backrest frame such that the upper frame plate can solely rotate independently. Interference with inner appliances of the car during seat rotation is prevented, and any concern over safety hazards to the occupant is avoided in advance.

Another aspect of the present disclosure is to provide a rotary car seat facilitating getting in/out of a car wherein the link portion has a rotating shaft that is eccentric toward a car door, thereby preventing interference with peripheral appliances when the rotating shaft is positioned at the center of the upper frame plate or on the outermost side thereof.

Another aspect of the present disclosure is to provide a rotary car seat facilitating getting in/out of a car wherein the link portion includes a rotating shaft protrusion coupled to a lower surface of the upper frame plate and formed to protrude downward, and a rotating shaft protrusion containing tube coupled to an upper surface of the lower frame plate and formed to protrude upward, a space being formed inside the rotating shaft protrusion containing tube so as to contain the rotating shaft protrusion. The seat arranged to face forward can naturally rotate in a direction in which the occupant gets in/out of the car, before the car starts traveling, or after the traveling is over, thereby facilitating the occupant's getting in/out of the car.

Another aspect of the present disclosure is to provide a rotary car seat facilitating getting in/out of a car wherein the upper frame plate includes a roller portion having a wheel such that the upper frame plate efficiently rotates on the lower frame plate.

Another aspect of the present disclosure is to provide a rotary car seat facilitating getting in/out of a car wherein the lower frame plate includes a guide groove formed to be recessed inward from the lower frame plate along a trajectory of movement of the roller portion that is supposed to move when the upper frame plate rotates around the rotating shaft, so as to guide movement of the roller portion. Accordingly, the roller portion coupled to the upper frame plate is prevented from moving away from the predetermined position, and when the upper frame plate moves on the lower frame plate, the upper frame plate can smoothly rotate as if sliding.

Another aspect of the present disclosure is to provide a rotary car seat facilitating getting in/out of a car wherein multiple guide grooves are formed in positions with different radii around the rotating shaft. If a single guide groove is configured, stress is concentrated and causes rapid wear, damage, and the like of the guide groove, finally failing to implement a natural rotational movement of the upper frame plate. This problem can be solved by configuring multiple guide grooves and thereby distributing the stress.

Another aspect of the present disclosure is to provide a rotary car seat facilitating getting in/out of a car wherein multiple roller portions are formed in positions corresponding to the guide grooves when the upper frame plate and the lower frame plate are registered. The problem of stress concentration and the resulting rapid wear, damage, and the like of the guide grooves is prevented by distributing the load. When the upper frame plate moves on the lower frame plate, the upper frame plate is enabled to smoothly rotate as if sliding stably.

Another aspect of the present disclosure is to provide a rotary car seat facilitating getting in/out of a car wherein the cushion frame further includes a position setting means configured to set an area of rotation of the upper frame plate. This solves the problem of excessive rotation of the upper frame plate and detachment from the lower frame plate. In addition, when the upper frame plate is completely rotated to a predetermined position, the same is supposed to remain fixed stably while maintaining the completely rotated condition, even if an external force is applied.

Another aspect of the present disclosure is to provide a rotary car seat facilitating getting in/out of a car wherein the position setting means includes an engaging portion having a protrusion formed to protrude therefrom, and a locking portion having a protrusion containing groove formed thereon so as to contain the protrusion of the engaging portion. This solves the problem of excessive rotation of the upper frame plate and detachment from the lower frame plate. In addition, predetermined retaining power is secured such that the initially registered condition or the completely rotated condition can be maintained.

Another aspect of the present disclosure is to provide a rotary car seat facilitating getting in/out of a car wherein the engaging portion is coupled to the lower frame plate such that the protruding protrusion faces the upper frame plate, and the locking portion is coupled to the upper frame plate so as to contain the protrusion facing the upper frame plate. This solves the problem of excessive rotation of the upper frame plate and detachment from the lower frame plate. In addition, predetermined retaining power is secured such that the initially registered condition or the completely rotated condition can be maintained.

Another aspect of the present disclosure is to provide a rotary car seat facilitating getting in/out of a car wherein the engaging portion includes a first engaging portion configured to retain the upper frame plate such that, when the upper frame plate and the lower frame plate are registered, the upper frame plate remains registered, and a second engaging portion configured to retain the upper frame plate at a rotation end point. Accordingly, predetermined retaining power is secured such that the initially registered condition or the completely rotated condition can be maintained.

Another aspect of the present disclosure is to provide a rotary car seat facilitating getting in/out of a car wherein the engaging portion has a rectangular planar shape, and the protrusion is elongated along a longitudinal direction. Accordingly, the position setting means can have stronger retaining power.

Another aspect of the present disclosure is to provide a rotary car seat facilitating getting in/out of a car wherein the engaging portion has a longitudinal axis that is perpendicular to a direction defined toward a front side of an occupant. Accordingly, when the occupant generates a movement by getting up toward the front when getting out of the car, the position setting means is not pushed back, and can secure predetermined retaining power.

Another aspect of the present disclosure is to provide a rotary car seat facilitating getting in/out of a car wherein the longitudinal axis of the first engaging portion is perpendicular to a longitudinal axis of the second engaging portion. This makes it possible to secure retaining power necessary for the upper frame plate to remain registered with the lower frame plate without rotating when the occupant has no intention to get in/out of the car. Such retaining power is also needed to determine the limit of rotation of the upper frame plate, when the occupant intends to get in/out of the car, such that the upper frame plate is prevented from rotating further than the rotation end point (where the rotation ends).

The present disclosure is implemented by embodiments having the following configurations, in order to accomplish the above-mentioned aspects.

According to an embodiment of the present disclosure, the present disclosure is characterized by including: a frame portion constituting a framework of a seat and supporting a load; and a sheath portion formed outside the frame portion, wherein the frame portion includes a backrest frame constituting a framework of a backrest seat and supporting a load, and a cushion frame constituting a framework of a cushion seat and supporting a load, and the cushion seat can rotate independently of the backrest seat.

According to another embodiment of the present disclosure, the present disclosure is characterized in that the cushion frame includes an upper frame plate on which the sheath portion is seated, a lower frame plate formed beneath the upper frame plate, and a link portion connecting the upper frame plate to be able to rotate on the lower frame plate.

According to another embodiment of the present disclosure, the present disclosure is characterized in that the lower frame plate is connected to the backrest frame, and the upper frame plate is not connected to the backrest frame such that the upper frame plate can solely rotate independently.

According to another embodiment of the present disclosure, the present disclosure is characterized in that the link portion has a rotating shaft that is eccentric toward a car door.

According to another embodiment of the present disclosure, the present disclosure is characterized in that the link portion includes a rotating shaft protrusion coupled to a lower surface of the upper frame plate and formed to protrude downward, and a rotating shaft protrusion containing tube coupled to an upper surface of the lower frame plate and formed to protrude upward, a space being formed inside the rotating shaft protrusion containing tube so as to contain the rotating shaft protrusion.

According to another embodiment of the present disclosure, the present disclosure is characterized in that the upper frame plate includes a roller portion having a wheel such that the upper frame plate efficiently rotates on the lower frame plate.

According to another embodiment of the present disclosure, the present disclosure is characterized in that the lower frame plate includes a guide groove formed to be recessed inward from the lower frame plate along a trajectory of movement of the roller portion that is supposed to move when the upper frame plate rotates around the rotating shaft, so as to guide movement of the roller portion.

According to another embodiment of the present disclosure, the present disclosure is characterized in that multiple guide grooves are formed in positions with different radii around the rotating shaft.

According to another embodiment of the present disclosure, the present disclosure is characterized in that multiple roller portions are formed in positions corresponding to the guide grooves when the upper frame plate and the lower frame plate are registered.

According to another embodiment of the present disclosure, the present disclosure is characterized in that the cushion frame further includes a position setting means configured to set an area of rotation of the upper frame plate.

According to another embodiment of the present disclosure, the present disclosure is characterized in that the position setting means includes an engaging portion having a protrusion formed to protrude therefrom, and a locking portion having a protrusion containing groove formed thereon so as to contain the protrusion of the engaging portion.

According to another embodiment of the present disclosure, the present disclosure is characterized in that the engaging portion is coupled to the lower frame plate such that the protruding protrusion faces the upper frame plate, and the locking portion is coupled to the upper frame plate so as to contain the protrusion facing the upper frame plate.

According to another embodiment of the present disclosure, the present disclosure is characterized in that the engaging portion includes a first engaging portion configured to retain the upper frame plate such that, when the upper frame plate and the lower frame plate are registered, the upper frame plate remains registered, and a second engaging portion configured to retain the upper frame plate at a rotation end point.

According to another embodiment of the present disclosure, the present disclosure is characterized in that the engaging portion has a rectangular planar shape, and the protrusion is elongated along a longitudinal direction.

According to another embodiment of the present disclosure, the present disclosure is characterized in that the engaging portion has a longitudinal axis that is perpendicular to a direction defined toward a front side of an occupant.

According to another embodiment of the present disclosure, the present disclosure is characterized in that the longitudinal axis of the first engaging portion is perpendicular to a longitudinal axis of the second engaging portion.

Following advantageous effects can be obtained by combination/usage of the above-described embodiments of the present disclosure and the features described below.

The present disclosure advantageously provides a rotary car seat facilitating getting in/out of a car, the rotary car seat including: a frame portion constituting a framework of a seat and supporting a load; and a sheath portion formed outside the frame portion, wherein the frame portion includes a backrest frame constituting a framework of a backrest seat and supporting a load, and a cushion frame constituting a framework of a cushion seat and supporting a load, and the cushion seat can rotate independently of the backrest seat. The seat arranged to face forward can naturally rotate in a direction in which the occupant gets in/out of the car, before the car starts traveling, or after the traveling is over, thereby facilitating the occupant's getting in/out of the car.

The present disclosure advantageously provides a rotary car seat wherein the cushion frame includes an upper frame plate on which the sheath portion is seated, a lower frame plate formed beneath the upper frame plate, and a link portion connecting the upper frame plate to be able to rotate on the lower frame plate. The seat arranged to face forward can naturally rotate in a direction in which the occupant gets in/out of the car, before the car starts traveling, or after the traveling is over, thereby facilitating the occupant's getting in/out of the car. The cushion frame is configured in a plate shape such that the load can be distributed, thereby securing durability against repeated rotating movements.

The present disclosure advantageously provides a rotary car seat facilitating getting in/out of a car wherein the lower frame plate is connected to the backrest frame, and the upper frame plate is not connected to the backrest frame such that the upper frame plate can solely rotate independently. Interference with inner appliances of the car during seat rotation is prevented, and any concern over safety hazards to the occupant is avoided in advance.

The present disclosure advantageously provides a rotary car seat facilitating getting in/out of a car wherein the link portion has a rotating shaft that is eccentric toward a car door, thereby preventing interference with peripheral appliances when the rotating shaft is positioned at the center of the upper frame plate or on the outermost side thereof.

The present disclosure advantageously provides a rotary car seat facilitating getting in/out of a car wherein the link portion includes a rotating shaft protrusion coupled to a lower surface of the upper frame plate and formed to protrude downward, and a rotating shaft protrusion containing tube coupled to an upper surface of the lower frame plate and formed to protrude upward, a space being formed inside the rotating shaft protrusion containing tube so as to contain the rotating shaft protrusion. The seat arranged to face forward can naturally rotate in a direction in which the occupant gets in/out of the car, before the car starts traveling, or after the traveling is over, thereby facilitating the occupant's getting in/out of the car.

The present disclosure advantageously provides a rotary car seat facilitating getting in/out of a car wherein the upper frame plate includes a roller portion having a wheel such that the upper frame plate efficiently rotates on the lower frame plate.

The present disclosure advantageously provides a rotary car seat facilitating getting in/out of a car wherein the lower frame plate includes a guide groove formed to be recessed inward from the lower frame plate along a trajectory of movement of the roller portion that is supposed to move when the upper frame plate rotates around the rotating shaft, so as to guide movement of the roller portion. Accordingly, the roller portion coupled to the upper frame plate is prevented from moving away from the predetermined position, and when the upper frame plate moves on the lower frame plate, the upper frame plate can smoothly rotate as if sliding.

The present disclosure advantageously provides a rotary car seat facilitating getting in/out of a car wherein multiple guide grooves are formed in positions with different radii around the rotating shaft. If a single guide groove is configured, stress is concentrated and causes rapid wear, damage, and the like of the guide groove, finally failing to implement a natural rotational movement of the upper frame plate. This problem can be solved by configuring multiple guide grooves and thereby distributing the stress.

The present disclosure advantageously provides a rotary car seat facilitating getting in/out of a car wherein multiple roller portions are formed in positions corresponding to the guide grooves when the upper frame plate and the lower frame plate are registered. The problem of stress concentration and the resulting rapid wear, damage, and the like of the guide grooves is prevented by distributing the load. When the upper frame plate moves on the lower frame plate, the upper frame plate is enabled to smoothly rotate as if sliding stably.

The present disclosure advantageously provides a rotary car seat facilitating getting in/out of a car wherein the cushion frame further includes a position setting means configured to set an area of rotation of the upper frame plate. This solves the problem of excessive rotation of the upper frame plate and detachment from the lower frame plate. In addition, when the upper frame plate is completely rotated to a predetermined position, the same is supposed to remain fixed stably while maintaining the completely rotated condition, even if an external force is applied.

The present disclosure advantageously provides a rotary car seat facilitating getting in/out of a car wherein the position setting means includes an engaging portion having a protrusion formed to protrude therefrom, and a locking portion having a protrusion containing groove formed thereon so as to contain the protrusion of the engaging portion. This solves the problem of excessive rotation of the upper frame plate and detachment from the lower frame plate. In addition, predetermined retaining power is secured such that the initially registered condition or the completely rotated condition can be maintained.

The present disclosure advantageously provides a rotary car seat facilitating getting in/out of a car wherein the engaging portion is coupled to the lower frame plate such that the protruding protrusion faces the upper frame plate, and the locking portion is coupled to the upper frame plate so as to contain the protrusion facing the upper frame plate. This solves the problem of excessive rotation of the upper frame plate and detachment from the lower frame plate. In addition, predetermined retaining power is secured such that the initially registered condition or the completely rotated condition can be maintained.

The present disclosure advantageously provides a rotary car seat facilitating getting in/out of a car wherein the engaging portion includes a first engaging portion configured to retain the upper frame plate such that, when the upper frame plate and the lower frame plate are registered, the upper frame plate remains registered, and a second engaging portion configured to retain the upper frame plate at a rotation end point. Accordingly, predetermined retaining power is secured such that the initially registered condition or the completely rotated condition can be maintained.

Another aspect of the present disclosure is to provide a rotary car seat facilitating getting in/out of a car wherein the engaging portion has a rectangular planar shape, and the protrusion is elongated along a longitudinal direction. Accordingly, the position setting means can have stronger retaining power.

Another aspect of the present disclosure is to provide a rotary car seat facilitating getting in/out of a car wherein the engaging portion has a longitudinal axis that is perpendicular to a direction defined toward a front side of an occupant. Accordingly, when the occupant generates a movement by getting up toward the front when getting out of the car, the position setting means is not pushed back, and can secure predetermined retaining power.

Another aspect of the present disclosure is to provide a rotary car seat facilitating getting in/out of a car wherein the longitudinal axis of the first engaging portion is perpendicular to a longitudinal axis of the second engaging portion. This makes it possible to secure retaining power necessary for the upper frame plate to remain registered with the lower frame plate without rotating when the occupant has no intention to get in/out of the car. Such retaining power is also needed to determine the limit of rotation of the upper frame plate, when the occupant intends to get in/out of the car, such that the upper frame plate is prevented from rotating further than the rotation end point (where the rotation ends).

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, preferred embodiments of a rotary car seat facilitating getting in/out of a car according to the present disclosure will be described in detail with reference to the accompanying drawings. In the following description of the present disclosure, when a detailed description of a known function or feature is deemed to make the gist of the present disclosure unnecessarily unclear, the detailed description thereof will be omitted. Unless specifically defined, every term in the present specification has the same normal meaning of the term as understood by a person skilled in the art to which the present disclosure pertains. If such a normal meaning contradicts the meaning of the term used in the present specification, the definition used in the present specification will be followed. In describing embodiments of the present disclosure, the position and movement of each constituent element are defined according to the direction expressed by an arrow in each drawing, and will be separately defined in the context as needed.

Figure 1:
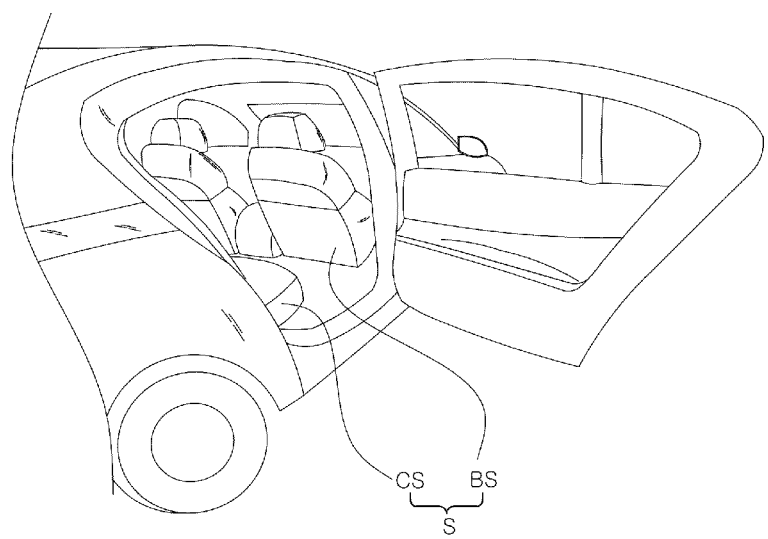
FIG. 1 illustrates the interior of a conventional car.

It is assumed in the drawings, which are for helping the description of the present disclosure, that an occupant on a rear seat of a car gets out of the car through the rear right door. As used herein, a seat S refers to a chair including a sheath made of fabric, leather, or the like and a frame included inside the sheath so as to support the load applied to the seat S and to exhibit the strength of the seat S. Referring to FIG. 1, such a seat S is divided into a backrest seat BS that makes contact with the occupant's back and a cushion seat CS that makes contact with the occupant's buttocks. The present disclosure is technically characterized in that the cushion seat CS can rotate independently of the backrest seat BS.

The rotary car seat 1 facilitating getting in/out of a car according to the present disclosure includes a sheath portion 10 and a frame portion 30.

The sheath portion 10 is formed outside the frame portion 30 (described later), surrounds the frame portion 30 such that the same is included therein, and makes direct contact with the occupant's body. The sheath portion 10 is not limited to a specific concept, and may be configured in various types with various materials including fabric and leather.

Figure 4:
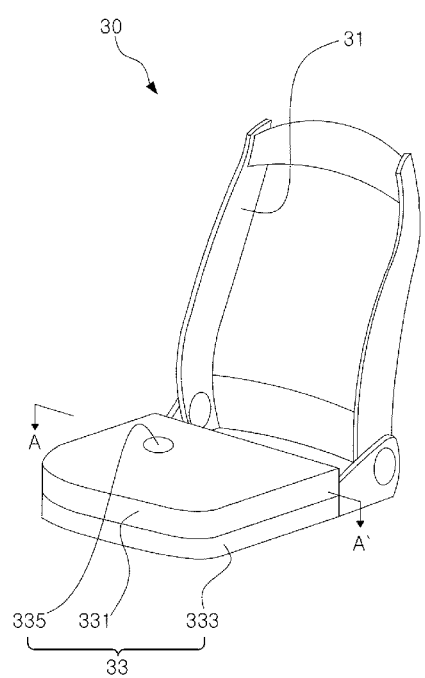
FIG. 4 is a perspective view of a frame portion of a rotary car seat facilitating getting in/out of a car according to an embodiment of the present disclosure.

FIG. 4 is a perspective view of a frame portion of a rotary car seat facilitating getting in/out of a car according to an embodiment of the present disclosure. FIG. 4 will be referred to in the following description.

The frame portion 30 is configured to constitute the framework of the seat and to support the load, is included inside the sheath portion 10, and plays the role of determining the rigidity and movement of the seat. The material of the frame portion 30 is not specifically limited, and various materials may constitute the same. The frame portion 30 includes a backrest frame 31 and a cushion frame 33.

The backrest frame 31 is configured to constitute the framework of the backrest seat BS and to support the load. The backrest frame 31 is not limited to a specific concept, but is preferably connected to be able to rotate relative to the cushion frame 33 such that, with reference to the cushion frame 33 (described later), the angle between the backrest frame 31 and the cushion frame 33 can be variously set.

The cushion frame 33 is configured to constitute the framework of the cushion seat CS and to support the load. The cushion frame 33 is not limited to a specific concept, but preferably, the cushion frame 33 may be configured in in the shape of a plate having a predetermined thickness as illustrated in FIG. 4. The cushion frame 33 includes an upper frame plate 331, a lower frame plate 333, a link portion 335, and a position setting means 337.

Figure 5:
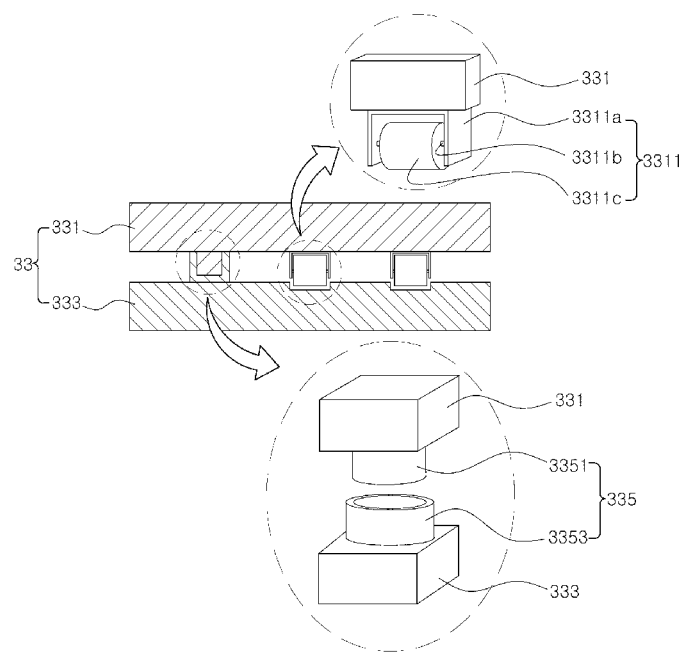
FIG. 5 is a sectional view taken along A-A' of FIG. 4.

FIG. 5 is a sectional view taken along A-A' of FIG. 4. FIG. 5 will be referred to in the following description.

The upper frame plate 331 is coupled beneath the sheath portion 10 and is configured such that the sheath portion 10 is seated thereon. The upper frame plate 331 is not limited to a specific concept, but preferably, the upper frame plate 331 may be configured in the shape of a plate having a predetermined thickness as illustrated in FIG. 5. The upper frame plate includes a roller portion 3311.

The roller portion 3311 is configured such that the upper frame plate 331 smoothly rotates on the lower frame plate 333 (described later). As illustrate in FIG. 5, the roller portion 3311 may preferably include a steel section 3311a coupled to the lower surface of the upper frame plate 331, a rotating shaft 3311b connected to and supported by the steel section 3311a, and a wheel 3311c coupled to the rotating shaft so as to rotate.

Figure 6:
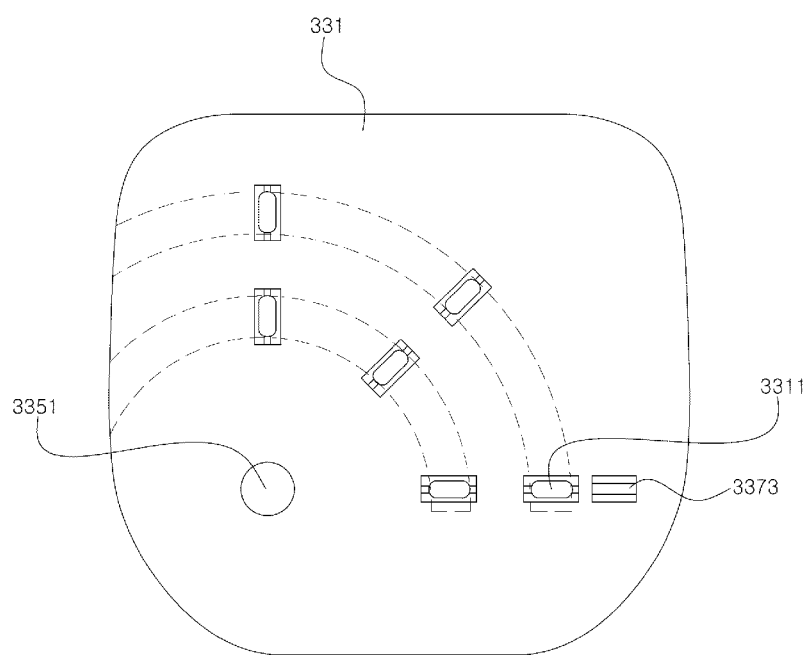
FIG. 6 illustrates an upper frame plate, seen from below, of a rotary car seat facilitating getting in/out of a car according to an embodiment of the present disclosure.

FIG. 6 illustrates the upper frame plate, seen from below, of the rotary car seat facilitating getting in/out of a car according to an embodiment of the present disclosure. Referring to FIG. 6, multiple roller portions 3311 may be formed in positions corresponding to those of guide grooves 3331 (described later) when the upper frame plate 331 and the lower frame plate 333 are registered. As used herein, registration refers to a condition in which the upper frame plate 331 is overlapped and superimposed on the lower frame plate 333 before rotating relative to the same.

Therefore, although a single guide groove 3331 is formed on the lower frame plate 333 (described later), multiple roller portions 3311 may be formed on the lower surface of the upper frame plate 331 in positions corresponding to that of the single guide groove 3331. If multiple guide grooves 3331 are formed on the lower frame plate 333, multiple roller portions 3311 may be configured on the lower surface of the upper frame plate 331 in positions corresponding to those of respective guide grooves 3331.

Referring to FIG. 5, the lower frame plate 333 is formed beneath the upper frame plate 331. The lower frame plate 333 is not limited to a specific concept, but preferably, the lower frame plate 333 may be configured in in the shape of a plate having a predetermined thickness as illustrated in FIG. 5. The lower frame plate 333 may have a planar shape complementary to the planar shape of the upper frame plate 331.

More preferably, the lower frame plate 333 may be connected to the backrest frame 31, and the upper frame plate 331 may not be connected to the backrest frame 31, thereby enabling only the upper frame plate 331 to rotate independently. This enables additional rotation of the cushion seat CS while maintaining the same conventional movement (for example, angle adjustment) of the backrest seat BS.

The lower frame plate 333 includes a guide groove 3331.

Figure 7:
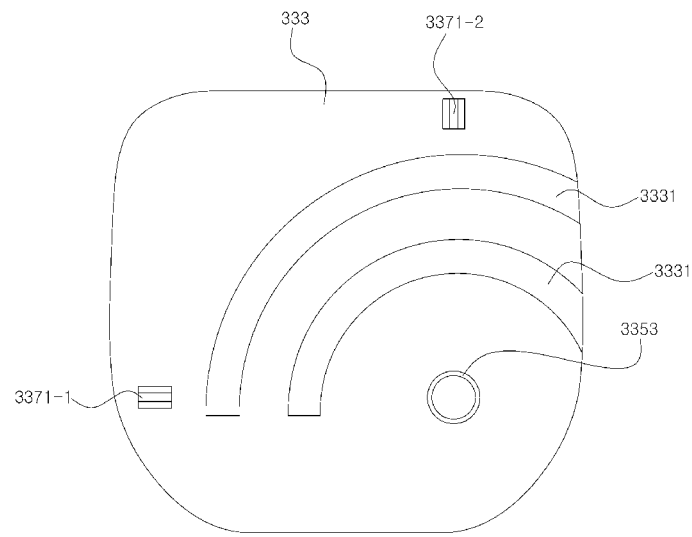
FIG. 7 illustrates a lower frame plate, seen from above, of a rotary car seat facilitating getting in/out of a car according to an embodiment of the present disclosure.

FIG. 7 illustrates the lower frame plate, seen from above, of a rotary car seat facilitating getting in/out of a car according to an embodiment of the present disclosure. Referring to FIG. 7, the guide groove 3331 is formed to be recessed inward from the lower frame plate 333 along the trajectory of movement the roller portion 3311, which is supposed to move when the upper frame plate 331 rotates around the rotating shaft of the link portion 335 (described later), so as to guide the movement of the roller portion 3311.

Multiple guide grooves 3331 may be formed in positions with different radii around the rotating shaft. If a single guide groove 3331 is configured, and if the upper frame plate 331 rotates as if siding above the same, stress is concentrated and causes rapid wear, damage, and the like of the guide groove 3331, finally failing to implement a natural rotational movement of the upper frame plate 331. This problem can be solved by configuring multiple guide grooves 3331 and thereby distributing the stress.

Referring to FIG. 5 to FIG. 7, the link portion 335 is configured to connect the upper frame plate 331 to be able to rotate on the lower frame plate 333. Since various peripheral appliances (for example, an armrest) are concentrated in the space inside the car, rotation of the cushion seat CS alone may result in interference with the peripheral appliances. Therefore, in order to avoid such interference, the link portion 335 may be preferably configured to have a rotating shaft that is eccentric toward the car door.

Figure 8A:
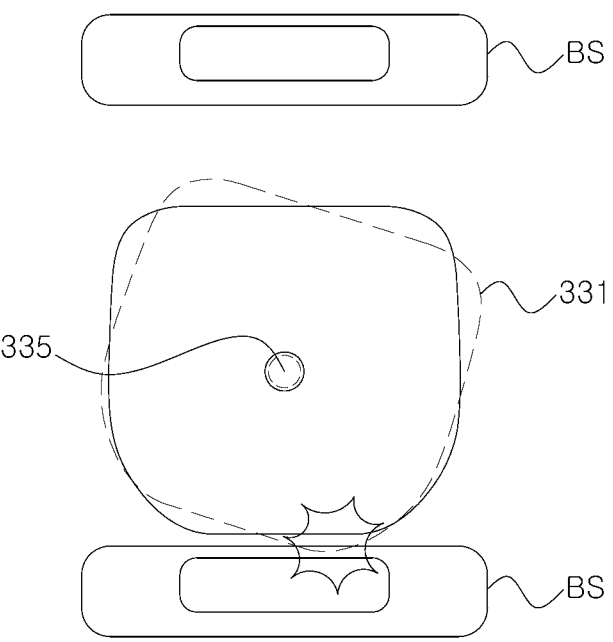
FIG. 8A illustrates whether or not interference occurs when a rotating shaft of a link portion of a rotary car seat facilitating getting in/out of a car according to an embodiment of the present disclosure is positioned at the center.
Figure 8B:
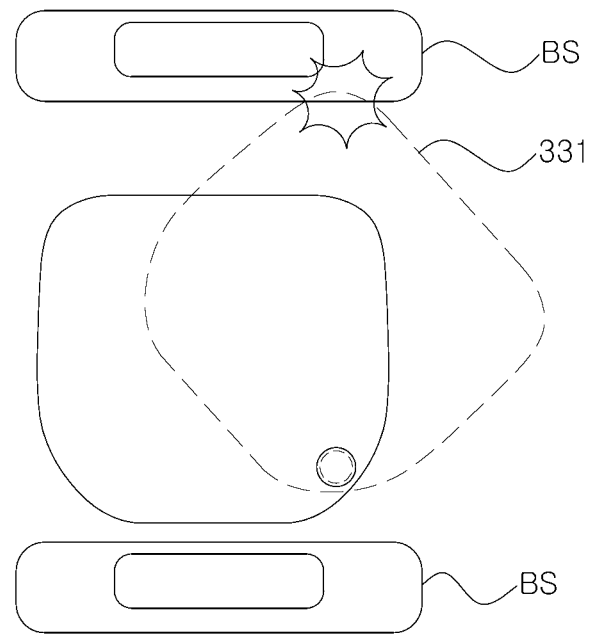
FIG. 8B illustrates whether or not interference occurs when a rotating shaft of a link portion of a rotary car seat facilitating getting in/out of a car according to an embodiment of the present disclosure is positioned on the outermost side.
Figure 8C:
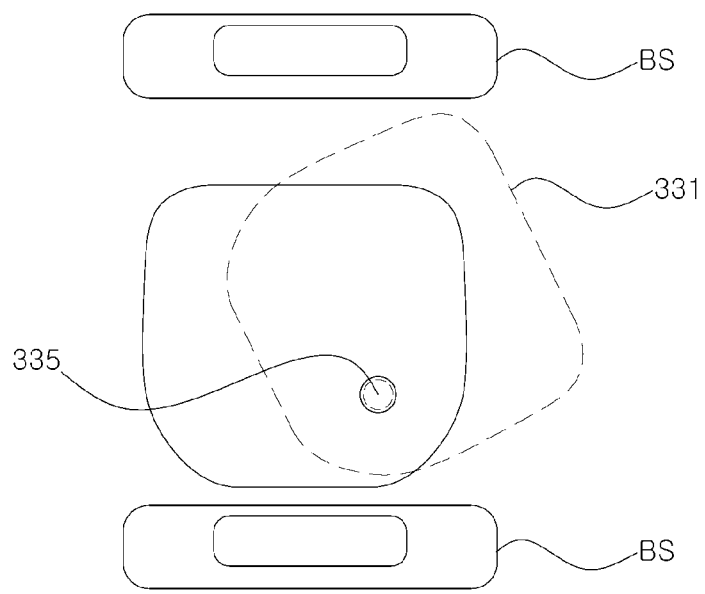
FIG. 8C illustrates whether or not interference occurs when a rotating shaft of a link portion of a rotary car seat facilitating getting in/out of a car according to an embodiment of the present disclosure is positioned to be eccentric from the center to some extent.

FIG. 8A illustrates whether or not interference occurs when the rotating shaft of the link portion of the rotary car seat facilitating getting in/out of a car according to an embodiment of the present disclosure is positioned at the center. FIG. 8B illustrates whether or not interference occurs when the rotating shaft of the link portion of the rotary car seat facilitating getting in/out of a car according to an embodiment of the present disclosure is positioned on the outermost side. FIG. 8C illustrates whether or not interference occurs when the rotating shaft of the link portion of the rotary car seat facilitating getting in/out of a car according to an embodiment of the present disclosure is eccentric from the center to some extent.

Referring to FIG. 8A, which assumes a situation in which the rotating shaft of the link portion 335 is positioned at the center of the upper frame plate 331 and the lower frame plate 333. It could be understood that, when the upper frame plate 331 rotates around the rotating shaft, the overall radius of rotation of the upper frame plate 331 is reduced, but interference with the backrest seat BS of the rear seat is likely to occur.

Referring to FIG. 8B, which assumes a situation in which the rotating shaft of the link portion 335 is positioned on the outermost side of the upper frame plate 331 and the lower frame plate 333. It could be understood from the illustration that, when the upper frame plate 331 rotates around the rotating shaft, the overall radius of rotation of the upper frame plate 331 increases, and interference with the backrest seat BS of the front seat is likely to occur.

On the other hand, referring to FIG. 8C, which assumes a situation in which the rotating shaft of the link portion 335 is positioned to be eccentric to some extent from the center of the upper frame plate 331 and the lower frame plate 333. It could be understood that, in this case, no interference with the backrest seat BS of the back seat occurs, and no interference with the backrest seat BS of the front seat occurs either.

Accordingly, positioning the rotating shaft of the link portion 335 to be eccentric to some extent from the center, not at the center or on the outermost side, such that no interference occurs, in view of the situation in which an occupant sits on the seat as well, can prevent the occupant's knees from colliding with a peripheral appliance, and other problems.

In other words, the link portion 335 is preferably configured to have a rotating shaft that is eccentric toward the car door.

The link portion 335 includes a rotating shaft protrusion 3351 and a rotating shaft protrusion containing tube 3353.

Referring to FIG. 5, the rotating shaft protrusion 3351 is coupled to the lower surface of the upper frame plate 331 and is formed to protrude downward. The rotating shaft protrusion 3351 may preferably be configured in a cylindrical shape for the purpose of rotation.

The rotating shaft protrusion containing tube 3353 is coupled to the upper surface of the lower frame plate and is formed to protrude upward such that a space is formed therein so as to contain the rotating shaft protrusion 3351. The rotating shaft protrusion containing tube 3353 may preferably be configured in the shape of a circular tube, the upper side of which is open, so as to contain the rotating shaft protrusion 3351 configured cylindrically.

Figure 9A:
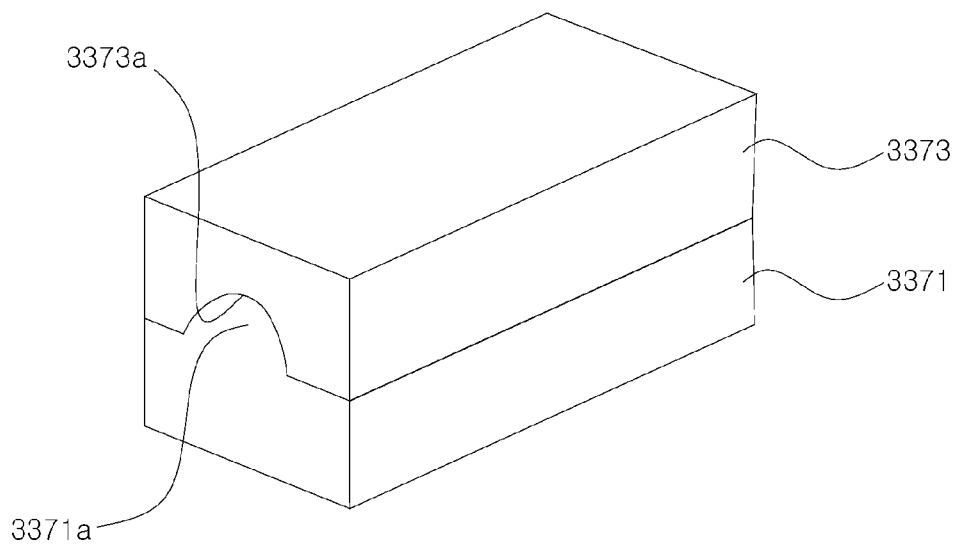
FIG. 9A is an assembled perspective view of a position setting means of a rotary car seat facilitating getting in/out of a car according to an embodiment of the present disclosure.
Figure 9B:
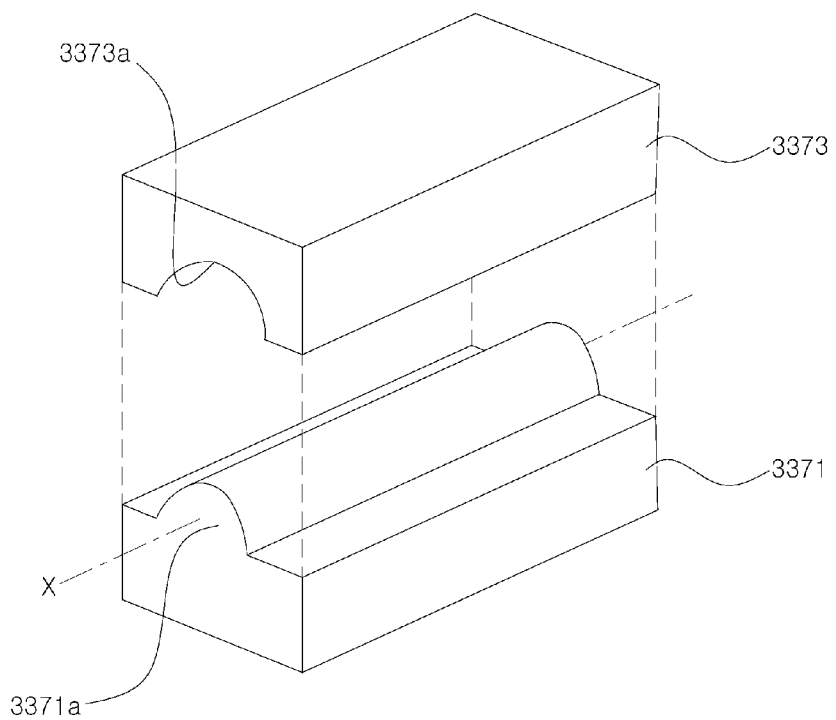
FIG. 9B is an exploded perspective view of a position setting means of a rotary car seat facilitating getting in/out of a car according to an embodiment of the present disclosure.

FIG. 9A is an assembled perspective view of a position setting means of a rotary car seat facilitating getting in/out of a car according to an embodiment of the present disclosure. FIG. 9B is an exploded perspective view of a position setting means of a rotary car seat facilitating getting in/out of a car according to an embodiment of the present disclosure. Referring to FIG. 9A and FIG. 9B, the position setting means 337 is configured to set an area of rotation of the upper frame plate 331.

The upper frame plate 331 makes a rotational movement as if sliding on the lower frame plate 333 by means of the roller portion 3311 and the guide groove 3331. If there is no separate feature for setting the area of rotation of such a rotational movement, the upper frame plate 331 will rotate excessively and move away from the lower frame plate 333, thereby causing a problem. In addition, when the upper frame plate 331 is completely rotated to a predetermined position, the same is supposed to remain fixed stably while maintaining the completely rotated condition, even if an external force is applied. The position setting means 337 is provided for such a function. The position setting means 337 includes an engaging portion 3371 and a locking portion 3373.

The engaging portion 3371 has a protrusion 3371a formed to protrude therefrom. The engaging portion 3371 is not limited to a specific concept, but the protrusion 3371a protruding therefrom may preferably be coupled to the upper surface of the lower frame plate 333 so as to face the lower surface of the upper frame plate 331.

The locking portion 3373 has a protrusion containing groove 3373a formed thereon so as to contain the protrusion 3371a. The locking portion 3373 is not limited to a specific concept, but may preferably be coupled to the lower surface of the upper frame plate 331 to be able to contain the protrusion 3371a of the engaging portion 3371, which protrudes toward the lower surface of the upper frame plate 331.

Retaining power resulting from coupling between the engaging portion 3371 and the locking portion 3373 is necessary for the upper frame plate 331 to remain registered with the lower frame plate 333 without rotating when the occupant has no intention to get in/out of the car. Such retaining power is also needed to determine the limit of rotation of the upper frame plate 331, when the occupant intends to get in/out of the car, such that the upper frame plate 331 is prevented from rotating further than the rotation end point (where the rotation ends). The above-mentioned retaining power may be needed at multiple locations.

To this end, multiple engaging portion 3371 may be configured, including a first engaging portion 3371-1 and a second engaging portion 3371-2.

Figure 10:
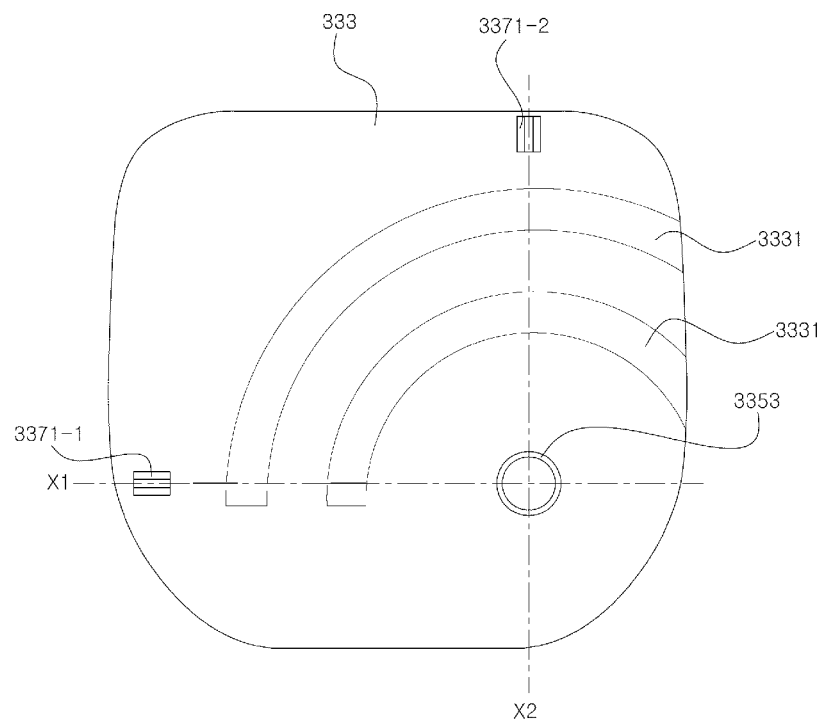
FIG. 10 illustrates the position of multiple engaging portions coupled to a lower frame of a rotary car seat facilitating getting in/out of a car according to an embodiment of the present disclosure.

FIG. 10 illustrates the position of multiple engaging portions coupled to the lower frame of a rotary car seat facilitating getting in/out of a car according to an embodiment of the present disclosure. Referring to FIG. 10, the first engaging portion 3371-1 is configured to retain the upper frame plate 331, when the upper frame plate 331 and the lower frame plate 333 are registered, such that the upper frame plate 331 remains registered. The second engaging portion 3371-2 is configured to retain the upper frame plate 331 at the rotation end point.

The present disclosure seeks to provide a car seat configured such that, before the car starts traveling, or after the traveling is over, a seat arranged to face forward can naturally rotate in a direction in which the occupant gets in/out of the car. The angle of rotation of the upper frame plate 331 is preferably 90°. The angle between the first engaging portion 3371-1 and the second engaging portion 3371-2 around the rotating shaft is also preferably 90°.

The engaging portion 3371 preferably has a rectangular planar shape as illustrated in FIG. 9, and the protrusion 3371a may be elongated along the longitudinal direction. In order to increase the retaining power by the protrusion 3371a, the engaging portion 3371 preferably has a longitudinal axis X perpendicular to the direction defined toward the front of the occupant.

As described above, the angle between the first engaging portion 3371-1 and the second engaging portion 3371-2 around the rotating shaft may preferably be 90°. Referring to FIG. 10, the longitudinal axis X1 of the first engaging portion 3371a and the longitudinal axis X2 of the second engaging portion 3371b may be configured perpendicularly to each other.

Figure 11A:
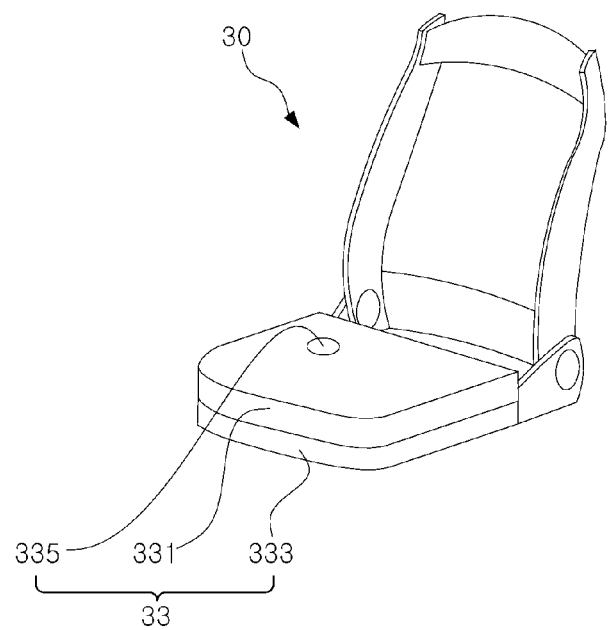
FIG. 11A illustrates a condition in which the upper frame plate and the lower frame plate of a rotary car seat facilitating getting in/out of a car according to an embodiment of the present disclosure are registered.
Figure 11B:
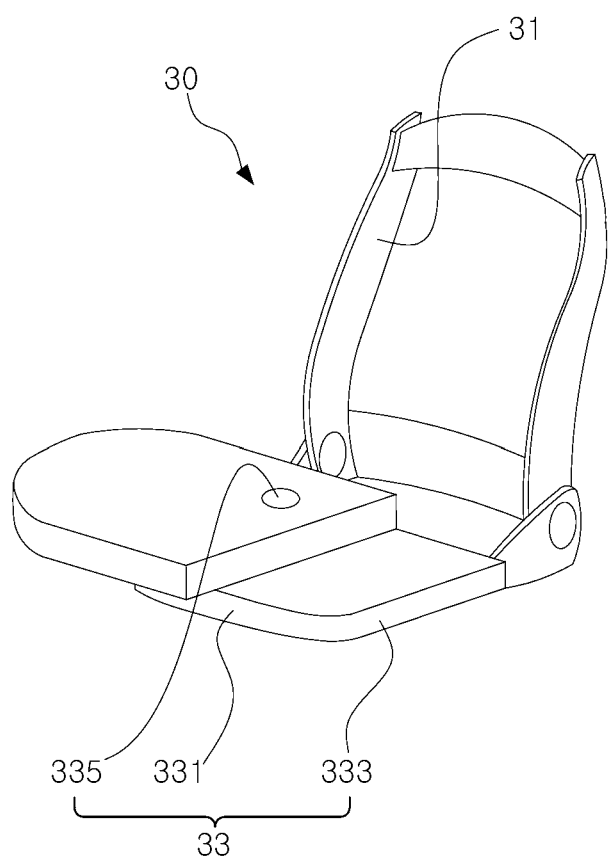
FIG. 11B illustrates a condition in which the upper frame plate of a rotary car seat facilitating getting in/out of a car according to an embodiment of the present disclosure is completely rotated.

FIG. 11A illustrates a condition in which the upper frame plate and the lower frame plate of a rotary car seat facilitating getting in/out of a car according to an embodiment of the present disclosure are registered. FIG. 11B illustrates a condition in which the upper frame plate of a rotary car seat facilitating getting in/out of a car according to an embodiment of the present disclosure is completely rotated. Referring to FIG. 11A and FIG. 11B, although no sheath portion 10 is illustrated in the drawings in order to focus on rotation of the upper frame plate 331, it would be obvious that a sheath portion 10 is formed outside the backrest frame 31 and the cushion frame 33.

When a person opens the car door in order to get in the car, the backrest seat BS of the seat S arranged forward remains as it is, and the cushion seat CS solely rotates toward the opened car door. When the person sits on the cushion seat CS, the cushion seat CS rotates again and toward a registered condition.

Figure 2:
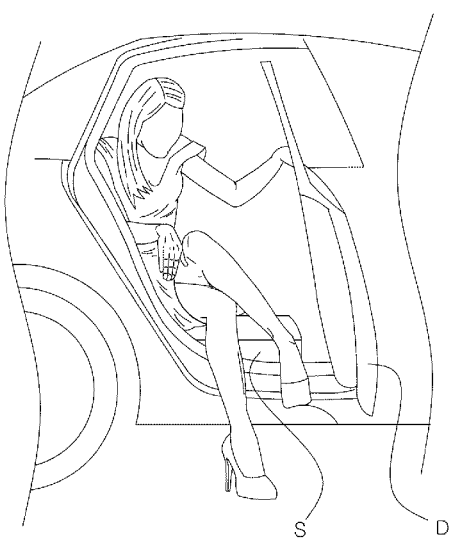
FIG. 2 illustrates a situation in which an occupant gets out of a conventional car.
Figure 3:
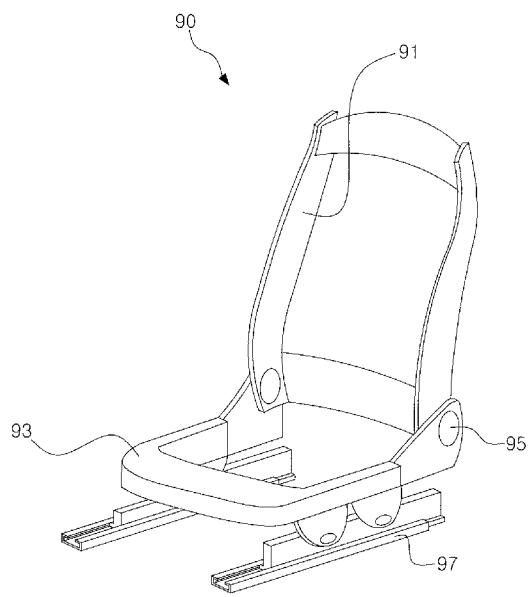
FIG. 3 illustrates a conventional car seat back frame assembly.

Inversely, when the person opens the door in order to get out of the car, the backrest seat BS of the seat S arranged forward remains as it is, and the cushion seat CS solely rotates toward the opened car door. This enables the person to get out of the car in the forward direction while keeping in a correct posture, without taking an inconvenient posture as illustrated in FIG. 2.

Such rotation is enabled by the upper frame plate 331 and the lower frame plate 333 connected by the link portion 335. The rotational movement in this regard may proceed automatically by providing a separate power means, or may proceed manually.

The above detailed description is an illustration of the present disclosure. In addition, the above description has been made in connection with preferred embodiments of the present disclosure, and the present disclosure can be used in various different combinations, changes, and environments. In other words, various changes or modifications are possible within the range of concept of the disclosure disclosed in the specification, the range equivalent to the disclosure, and/or the range of the technology or knowledge in the pertinent technical field. The described embodiments correspond to best modes for implementing the technical idea of the present disclosure, and various modifications are also possible as required by the detailed application field and usage of the present disclosure. Therefore, the above detailed description of the disclosure is not intended to limit the present disclosure to the disclosed embodiments. In addition, the accompanying claims need to be interpreted as including other embodiments.

What is claimed is:

1. A rotary car seat facilitating getting in/out of a car, the rotary car seat comprising:
    a frame portion constituting a framework of a seat; and
    a sheath portion formed outside the frame portion,
        wherein
    the frame portion comprises a backrest frame constituting a framework of a backrest seat, and a cushion frame constituting a framework of a cushion seat at least a portion of the cushion seat can rotate independently of the backrest seat, the cushion frame comprising an upper frame plate on which the sheath portion is seated, a lower frame plate formed beneath the upper frame plate, a link portion connected to the upper frame plate so as to enable the upper frame plate to rotate relative to the lower frame plate, and a position setting means configured to set an area of rotation of the upper frame plate, the position setting means comprising an engaging portion comprising a first engaging portion configured to retain the upper frame plate such that, when the upper frame plate and the lower frame plate are registered, the upper frame plate remains registered, and a second engaging portion configured to retain the upper frame plate at a rotation end point.

2. The rotary car seat facilitating getting in/out of a car of claim 1, wherein the lower frame plate is connected to the backrest frame, and the upper frame plate is not connected to the backrest frame such that the upper frame plate can solely rotate independently.

3. The rotary car seat facilitating getting in/out of a car of claim 2, wherein the link portion has a rotating shaft that is eccentric toward a car door.

4. The rotary car seat facilitating getting in/out of a car of claim 3, wherein the link portion comprises a rotating shaft protrusion coupled to a lower surface of the upper frame plate and formed to protrude downward, and a rotating shaft protrusion containing tube coupled to an upper surface of the lower frame plate and formed to protrude upward, a space being formed inside the rotating shaft protrusion containing tube so as to contain the rotating shaft protrusion.

5. The rotary car seat facilitating getting in/out of a car of claim 1, wherein the upper frame plate comprises a roller portion having a wheel such that the upper frame plate efficiently rotates on the lower frame plate.

6. The rotary car seat facilitating getting in/out of a car of claim 5, wherein the lower frame plate comprises a guide groove formed to be recessed inward from the lower frame plate along a trajectory of movement of the roller portion that is supposed to move when the upper frame plate rotates around the rotating shaft, so as to guide movement of the roller portion.

7. The rotary car seat facilitating getting in/out of a car of claim 6, wherein multiple guide grooves are formed in positions with different radii around the rotating shaft.

8. The rotary car seat facilitating getting in/out of a car of claim 7, wherein multiple roller portions are formed in positions corresponding to the guide grooves when the upper frame plate and the lower frame plate are registered.

9. The rotary car seat facilitating getting in/out of a car of claim 1, wherein the engaging portion further comprises a protrusion formed to protrude therefrom, wherein the position setting means further comprises a locking portion having a protrusion containing groove formed thereon so as to contain the protrusion of the engaging portion.

10. The rotary car seat facilitating getting in/out of a car of claim 9, wherein the engaging portion is coupled to the lower frame plate such that the protruding protrusion faces the upper frame plate, and the locking portion is coupled to the upper frame plate so as to contain the protrusion facing the upper frame plate.

11. The rotary car seat facilitating getting in/out of a car of claim 1, wherein the engaging portion has a rectangular planar shape, and the protrusion is elongated along a longitudinal direction.

12. The rotary car seat facilitating getting in/out of a car of claim 11, wherein the engaging portion has a longitudinal axis that is perpendicular to a direction defined toward a front side of an occupant.

13. The rotary car seat facilitating getting in/out of a car of claim 12, wherein the longitudinal axis of the first engaging portion is perpendicular to a longitudinal axis of the second engaging portion.

* * * * *